No. 769,840. PATENTED SEPT. 13, 1904.
C. SCHMIDT.
TRANSMISSION GEARING FOR MOTOR VEHICLES.
APPLICATION FILED NOV. 20, 1902.
NO MODEL. 2 SHEETS—SHEET 1.
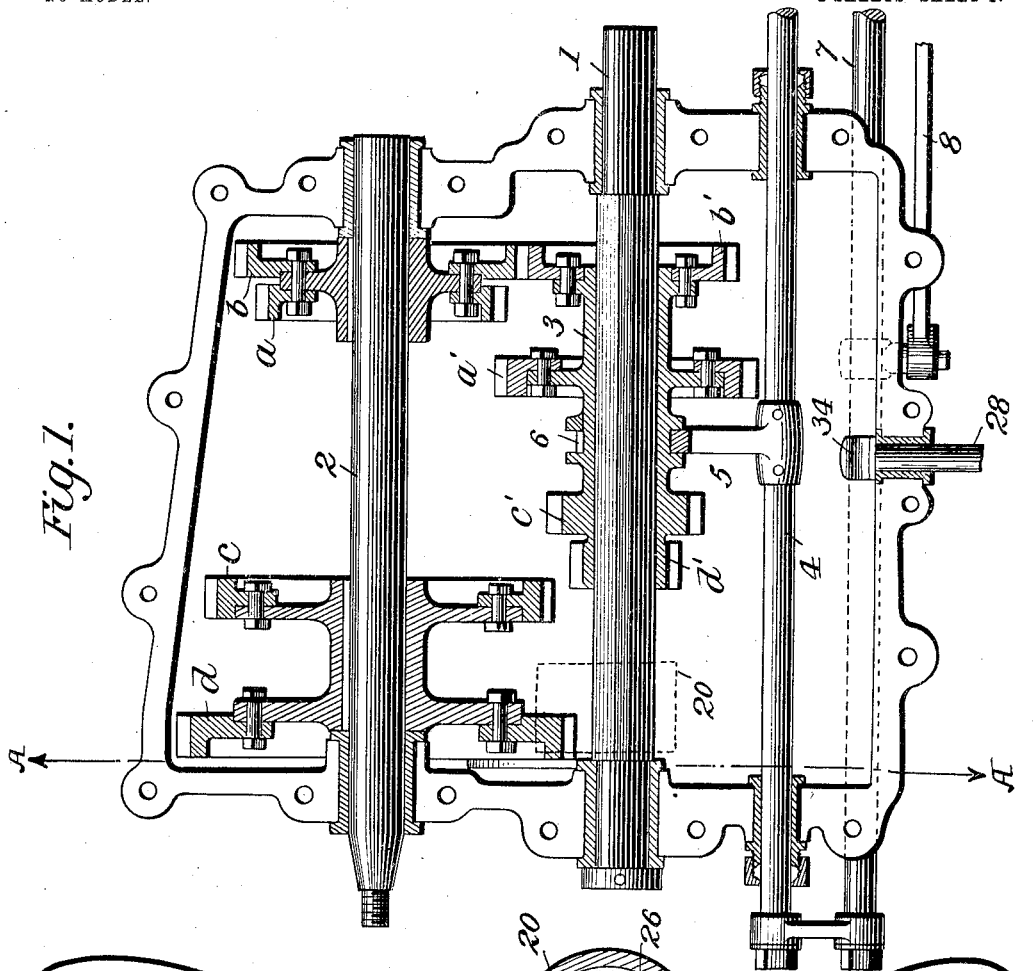
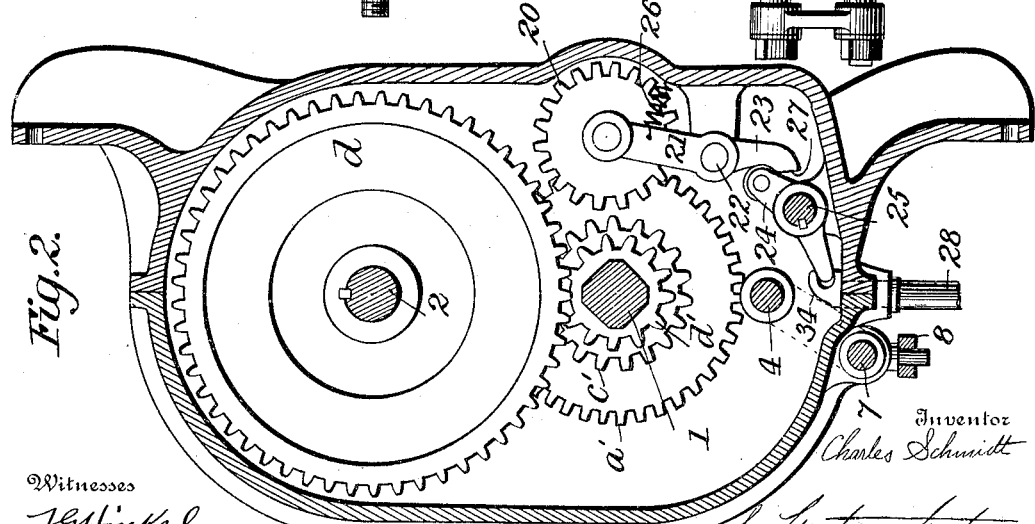
Witnesses
J. G. Hinkel
Arthur L. Bryant
Inventor
Charles Schmidt
by Watson & Watson
Attorneys

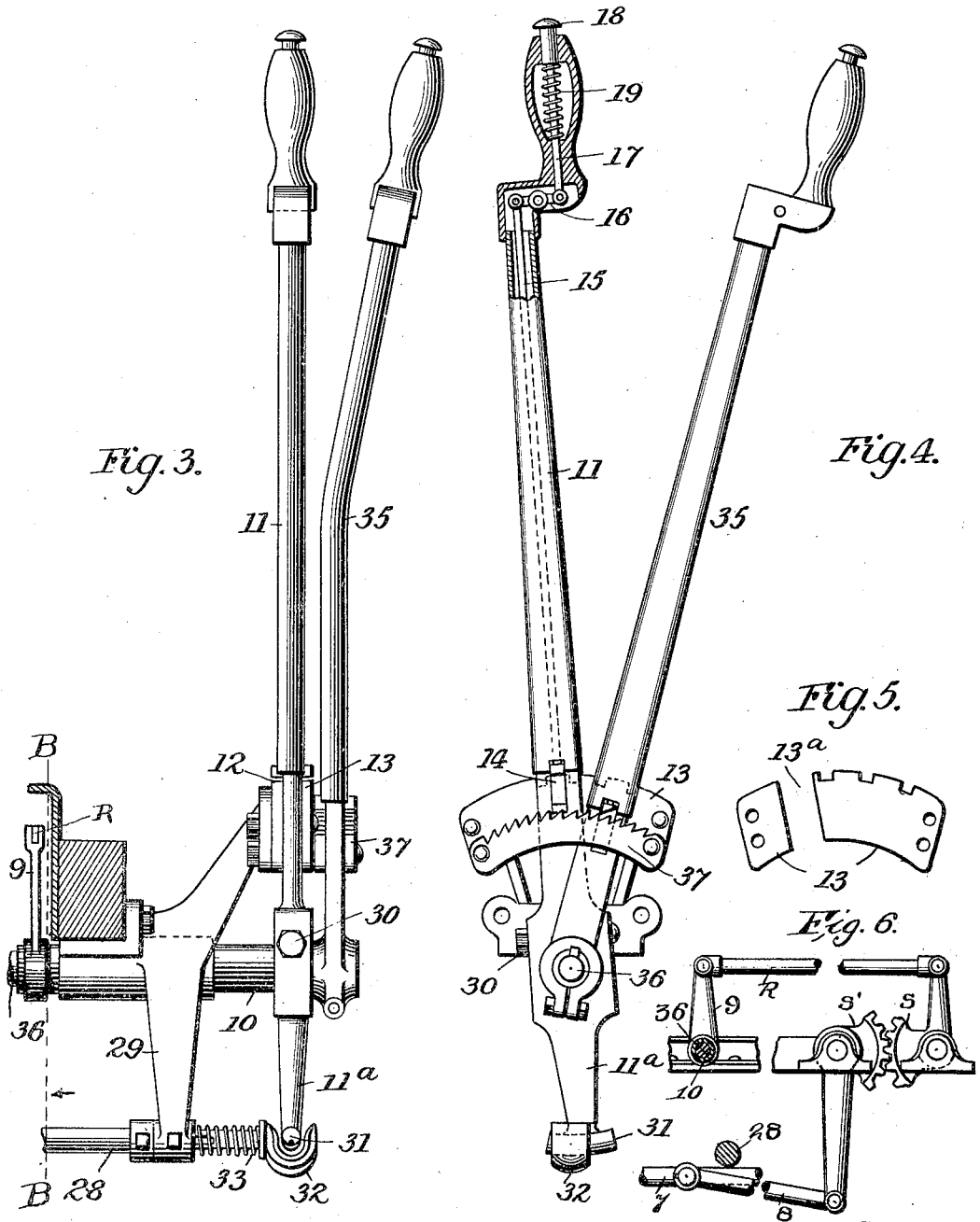

No. 769,840. Patented September 13, 1904.

UNITED STATES PATENT OFFICE.

CHARLES SCHMIDT, OF WARREN, OHIO, ASSIGNOR TO PACKARD MOTOR CAR COMPANY, OF WARREN, OHIO, A CORPORATION OF WEST VIRGINIA.

TRANSMISSION-GEARING FOR MOTOR-VEHICLES.

SPECIFICATION forming part of Letters Patent No. 769,840, dated September 13, 1904.

Application filed November 20, 1902. Serial No. 132,113. (No model.)

*To all whom it may concern:*

Be it known that I, CHARLES SCHMIDT, a citizen of France, residing at Warren, in the county of Trumbull, State of Ohio, have invented certain new and useful Improvements in Transmission-Gearing for Motor-Vehicles, of which the following is a specification.

This invention relates to improvements in transmission-gearing for motor-vehicles, the object being to simplify the construction and render the operation of such gearing easy and positive.

The invention is illustrated in the accompanying drawings, in which—

Figure 1 is a longitudinal central section through a system of gearing. Fig. 2 is a transverse section about on the line A A of Fig. 1. Fig. 3 is an elevation of the controlling-levers. Fig. 4 is a side elevation of said levers, and Fig. 5 is a detail of the outside locking-plate. Fig. 6 is an elevation, partly in section, on the line B B of Fig. 3.

Referring to the drawings, 1 indicates the motor-shaft, and 2 the driven shaft, which latter shaft is suitably connected to the driving-wheels. Upon the driven shaft are rigidly mounted four gears $a$, $b$, $c$, and $d$, increasing in size in the order named. Mounted to turn with and slide on the motor-shaft is a sleeve 3, to which are rigidly secured four gears $a'$, $b'$, $c'$, and $d'$, each decreasing in size in the order named and which are of suitable diameters to intermesh, respectively, with the gears $a$, $b$, $c$, and $d$. The several gears above described are so related that they may be all disengaged or that the gears on the sleeve 3 may be engaged successively with the gears on the shaft 2 in the order of their sizes. Thus when the sleeve is moved to the extreme left the smallest gear, $d'$, will be engaged with the gear $d$, and the driven shaft will be operated at its slowest speed. Movement of the sleeve to the right will first disengage the gears $d d'$ and then engage the gears $c c'$, operating the driven shaft at the next higher speed. Further movement of the sleeve to the right will next disengage the gears $c c'$ and then engage the gears $b b'$, and finally a further movement to the right will first disengage the gears $b b'$ and then engage the gears $a a'$. The sleeve 3 is shifted by means of a sliding rod 4, which has an arm 5 engaging an annular groove 6 in the sleeve. The rod 4 is operated by a second rod 7, link 8, arm 9, shaft 10, and lever 11, the arm 9 and link 8 being suitably connected—for instance, as shown in Fig. 6—by a rod or link R, extending from the arm 9 to an arm on a sector-gear S, which meshes with a second sector-gear S', having an arm with which the link 8 is attached. The lever operates between two notched sector-plates 12 13 and is provided with a spring-pressed latch 14, which tends to enter the notches. The latch is connected through rod 15, lever 16, and rod 17 with a button 18 on the end of the lever. A spring 19 within the handle tends to raise the button and throw the latch into the notches. By pressing the button 18 the latch may be withdrawn from the notches. Each plate is provided with four notches corresponding to the four forward speeds effected by the gearing above described.

The backward movement is obtained by a backing-gear 20, which is adapted to be thrown into mesh with the gears $d d'$ when the latter are adjacent to but not in mesh with each other, the backing-gear being broad enough to engage both gears when they are out of mesh. The backing-gear 20 is mounted in a yoke 21, which swings on a fixed pivot 22. The yoke 21 has an arm 23, which is engaged by a roller on a short two-armed lever 24, mounted on a fixed pivot 25. The spring 26 tends to hold the backing-gear 20 out of mesh with the driving-gears, and said backing-gear can be thrown into mesh with the gears $d d'$ by rocking the lever 24. Said lever 24 engages a flat surface 27 on the arm 23 and runs thereon slightly past the "dead-center" between said surface and the roller, thus locking them against the influence of the spring 26. The lever 24 is operated by a rod 28, which extends through a bracket 29 beneath the shaft 10. The lever 11 is mounted upon a pivot 30, connected to the shaft 10, whereby it is free to swing sidewise, although the shaft 10 must turn with the lever. The lower arm 11ª of lever 11 has a T-piece 31, which swings in the hook-shaped extremity 32 of the rod 28. A spring 33 tends to throw the rod 28 outward to bring the hook 32 into the normal plane of the arm 11ª. On the inner end of the rod 28 is an open yoke or hook 34, which engages an arm of the lever 24 and operates said lever. The hand-lever 11 can only be rocked sidewise on the pivot 30 when it registers with the slot or opening 13ª in the two-part sector-plate 13. When the lever is in this position, the gears $d\ d'$ are adjacent to each other and none of the gears $a\ b\ c\ d$ are in mesh with their corresponding gears. When it is desired to back the vehicle, the lever 11 is brought to this middle position and then moved sidewise through the slot 13ª, which throws the backing-gear into mesh with the gears $d\ d'$ by means heretofore described, thus backing the vehicle at the slowest speed.

In the drawings is shown a brake-lever 35, operating a brake-shaft 36 within the shaft 10, and a tooth-sector 37 for locking the brake-lever; but these brake devices are not included in the present invention.

It will be seen that the present invention provides for four speeds forward and one speed backward and that the mechanism involved is simple and positive in construction. The operation will be obvious from the preceding description.

Having described the invention, what is claimed as new is—

1. In a transmission-gearing for motor-vehicles, the combination with a motor-shaft, the driven shaft, and the gears of different sizes mounted thereon, of a hand-lever for throwing said gears into and out of mesh, a backing-gear, and means for operating said backing-gear by a side movement of said hand-lever to throw it into and out of operation.

2. In a transmission-gearing for motor-vehicles, the combination with a driven shaft, a motor-shaft, and relatively movable gears on said shafts, of a backing-gear, a lever constructed to swing in two directions, and means whereby when the lever is swung in one direction the relatively movable gears will be shifted and when it is swung in a direction transverse to that aforesaid the backing-gear will be thrown into and out of operation.

3. In a transmission-gearing for motor-vehicles, the combination with a driven shaft having gears fixed thereon, a motor-shaft having gears slidable thereon, and a backing-gear adapted and arranged to be moved in a circular path into and out of mesh with gears on both shafts, of a hand-lever for shifting the slidable gears, a sector for guiding said hand-lever, and a pivot upon which said hand-lever may be moved laterally, said sector having an opening or recess into which the hand-lever is moved laterally while moving the backing-gear to and from operative position.

4. In a transmission-gear for motor-vehicles, the combination with the driven shaft, the motor-shaft, and the relatively movable gears thereon, of the backing-gear arranged to swing in a circular path upon a pivotal support, a lever for operating said backing-gear, a sliding rod for operating said lever, and a hand-lever adapted to shift the gears by a movement in one direction and to operate said sliding rod and move the backing-gear by a movement in a second direction.

5. In a transmission-gearing for motor-vehicles, the combination with the driven shaft, the motor-shaft, the relatively movable gears thereon, and the backing-gear, of the shaft 10 having connections to said relatively movable gears, the lever 11 connected to said shaft by a pivot whereby it may swing laterally without turning said shaft, and connections between said lever and the backing-gear whereby the latter may be thrown into and out of operation by a movement of the lever upon its pivot.

6. In a transmission-gearing for motor-vehicles, the combination with the driven shaft, the motor-shaft, the relatively movable gears thereon, and the backing-gear, of a lever arranged to swing in a given plane to shift the relatively movable gears, a rod 28 adapted to be engaged by said lever in one of its positions, and connections between said rod and the backing-gear, said rod being operated by a lateral movement of the lever.

7. In a transmission-gearing for motor-vehicles, the combination with a driven shaft, a motor-shaft, relatively movable gears thereon, and a backing-gear, of a pivoted arm upon which said backing-gear is mounted, a lever 24 adapted to operate said arm and to lock said gear in operative position, an operating-lever and a connection between said operating-lever and said lever 24, the said operating-lever being adapted to shift the relatively movable gears by a movement in one direction and to shift the backing-gear by a lateral movement.

In testimony whereof I affix my signature in presence of two witnesses.

CHAS. SCHMIDT.

Witnesses:
JAS. W. PACKARD,
W. D. PACKARD.